(12) United States Patent
Matsushita et al.

(10) Patent No.: US 8,433,432 B2
(45) Date of Patent: Apr. 30, 2013

(54) APPARATUS AND METHOD FOR SUPPORTING CREATION OF ASSEMBLY DATA

(75) Inventors: Kazunori Matsushita, Kanagawa (JP); Shinsuke Noda, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 12/700,033

(22) Filed: Feb. 4, 2010

(65) Prior Publication Data
US 2010/0198385 A1      Aug. 5, 2010

(30) Foreign Application Priority Data

Feb. 5, 2009 (JP) .................................. 2009-24500

(51) Int. Cl.
*G06F 19/00* (2011.01)
(52) U.S. Cl.
USPC ............... 700/98; 700/97; 700/110; 700/107; 345/420
(58) Field of Classification Search ............... 700/98, 700/103, 104, 110, 114, 117; 702/182, 185; 345/419, 420, 619
See application file for complete search history.

(56) References Cited

U.S. PATENT DOCUMENTS

| | | | |
|---|---|---|---|
| 5,617,321 A * | 4/1997 | Frizelle et al. | 700/104 |
| 6,973,358 B2 * | 12/2005 | Yamamoto et al. | 700/98 |
| 7,398,129 B2 * | 7/2008 | Ishii et al. | 700/104 |
| 7,538,764 B2 * | 5/2009 | Salomie | 345/420 |
| 7,565,216 B2 * | 7/2009 | Soucy | 700/98 |
| 8,132,123 B2 * | 3/2012 | Schrag et al. | 715/851 |
| 2002/0123812 A1 * | 9/2002 | Jayaram et al. | 700/98 |
| 2005/0089214 A1 * | 4/2005 | Rubbert et al. | 382/154 |
| 2006/0281041 A1 * | 12/2006 | Rubbert et al. | 433/24 |

FOREIGN PATENT DOCUMENTS

| | | |
|---|---|---|
| JP | 7200659 | 8/1995 |
| JP | 8063511 | 3/1996 |
| JP | 9171565 | 6/1997 |

OTHER PUBLICATIONS

JP06103340A2: Design Supporting Device—English translation of abstract for Japanese patent application No. JP1992000254747, https://www.delphion.com/details?pn=JP06103340A2, pp. 1-2 (Dec. 8, 2009).

(Continued)

*Primary Examiner* — John Cottingham
*Assistant Examiner* — Douglas Lee
(74) *Attorney, Agent, or Firm* — Ido Tuchman; Libby Z. Toub

(57) ABSTRACT

Techniques to manage position information of parts such that, if discrepancy of the parts occurs, the discrepancy can be detected and corrected while the advantages of using the constraint conditions can be offered. In one embodiment, when an input unit receives information of an icon click, a receiving section receives the information of the click, and a saving section saves the position and the angle of geographic data indicating the three-dimensional geometry of the part as absolute-position information calculated with reference to the absolute origin into the storage unit. Then, when updating geographic-data position information on the basis of relative-position information indicating the constraint condition in the assembly data, an updating section instructs a display-data output section to display the consistency/inconsistency with the stored absolute-position information on a display, and a correcting section corrects the updated geographic-data position information on the basis of the stored absolute-position information.

9 Claims, 11 Drawing Sheets

OTHER PUBLICATIONS

JP02152149A2: Electron Gun Power Source Device—English translation of abstract for Japanese patent application No. JP1988000305265, https://www.delphion.com/details?pn=JP02152149A2, pp. 1-2 (Dec. 8, 2009).

Patent Abstracts of Japan—English translation of abstract for Japanese patent application No. 06-199978, http://www19.ipdl.inpit.go.jp/PA1/result/detail/main/wAAALDagHpDA408063495 . . . , pp. 1 (Dec. 9, 2009).

* cited by examiner

APPARATUS AND METHOD FOR SUPPORTING CREATION OF ASSEMBLY DATA

TECHNICAL FIELD

The present invention relates to an apparatus and a method for supporting the creation of assembly data. In particular, the present invention relates to an apparatus and a method for supporting the creation of assembly data indicating the assembly state of a plurality of parts.

BACKGROUND ART

In recent years, design work using a parametric 3D-CAD (three-dimensional computer-aided design) is mainstream in the field of mechanical design. In this parametric 3D-CAD, individual parts are managed using independent files, and an assembly (assembled parts) constituted of individual parts is also managed using a file different from these files. The assembly holds parameters indicating constraint conditions, such as distance, angle, and coincidence, called "assembly constraint". The relative position relationship among the parts is determined using such parameters. These constraint conditions can reflect screw fastening, latch engagement, etc. of actually manufactured products. Therefore, the use of the constraint conditions allows positioning according to actual-good design intention. In a 3D model to which constraints are properly given, the constraints act in accordance with the geometry of the parts to automatically update the relative position among the parts to the design intention.

SUMMARY

When the geometry of a part is modified, for example, constraints related to the part are accumulated with reference to one another. Therefore, if one constraint or the geometry of the part on which the constraint is based has discrepancy or the like due to some problem, the position relationship among the other parts also have chain discrepancy. If a constraint of one portion is changed, its influence spreads to change the position of an unexpected part. Furthermore, if a change is made to cause inconsistency among several constraints, the parts may not be located in proper positions to cause discrepancy. It often takes much time to find such unexpected discrepancy because there is no absolute reference that allows everybody to determine that "this portion and this portion should be coincident".

If designing proceeds without such discrepancy noticed, the designing proceeds on the basis of the improper position relationship, so related parts will have improper geometry. This causes the design having the improperness to spread until the discrepancy is found, thus causing the situation that the designer cannot determine what should be corrected with which reference when trying to correct the discrepancy after the discrepancy is found. Such situation finally needs significantly troublesome work to review the conditions one by one for correction.

To avoid such inconvenience, there is also a method of completely separating relative positions among the parts, that is, a method of designing without using the constraint conditions among the parts. However, if the constraint conditions are not used as described above, one of the advantages of the parametric 3D-CAD capable of reflecting designer's intention is abandoned.

A method of fixing the positions of the parts can be proposed; however, this will also abandon the advantages of the parametric 3D-CAD.

To this end, the present invention provides an apparatus that supports the creation of assembly data indicating the assembly state of a plurality of parts, the apparatus including a storage unit that stores relative-position information indicating constraint conditions among the plurality of parts, the constraint conditions concerning at least one of the relative positions and the rotations of the parts; a calculating section that calculates absolute-position information indicating at least one of the absolute positions and the rotations of the plurality of parts in the assembly data on the basis of the relative-position information stored in the storage unit; and a saving section that saves the absolute-position information calculated by the calculating section in response to the input of an instruction to save the assembly state of the plurality of parts into the storage unit.

The apparatus may further include a detecting section that detects inconsistency between the absolute-position information stored in the storage unit by the saving section and new absolute-position information calculated by the calculating section after the absolute-position information is stored in the storage unit.

The saving section may save the plurality of absolute-position information together with identification information on the plurality of absolute-position information into the storage unit. In this case, the apparatus may further include a correcting section that corrects, on the basis of absolute-position information identified from the plurality of absolute-position information stored in the storage unit by the saving section due to the input of identification information, new absolute-position information that is calculated by the calculating section after the plurality of absolute-position information is stored in the storage unit.

The storage unit may store geographic data indicating the geometry of the plurality of parts and the assembly data and stores the relative-position information in the assembly data; and the saving section may save the absolute-position information into the assembly data stored in the storage unit. In this case, the storage unit may store, in the assembly data, absolute-origin information indicating at least one of the origin and the absolute positions and the rotations of the coordinate axes serving as the reference of the absolute-position information in the assembly data.

The storage unit may store geographic data indicating the geometry of the plurality of parts, specific geographic data indicating the geometry of parts other than the plurality of parts, and the assembly data, and stores the relative-position information in the assembly data; and the saving section may save the absolute-position information into the specific geographic data stored in the storage unit. In this case, the storage unit may store absolute-origin geographic data, as the specific geographic data, that indicates the geometry of an origin part that defines at least one of the origin and the absolute positions and the rotations of the coordinate axes serving as the reference of the absolute-position information in the assembly data and may store, in the assembly data, absolute-origin relative-position information indicating the condition that the origin part is fixed in the assembly data as a constraint condition between the origin part and the assembly data, the constraint condition concerning at least one of the relative positions and the angles.

The present invention provides an apparatus that supports the creation of assembly data indicating the assembly state of a plurality of parts, the apparatus including a storage unit that stores relative-position information indicating constraint conditions among the plurality of parts, the constraint conditions concerning at least one of the relative positions and the rotations of the parts; a saving section that saves absolute-position information indicating at least one of the absolute positions and the rotations of the plurality of parts in the assembly data into the storage unit in such a manner that the saving time of the absolute-position information can be specified in response to the input of an instruction to store the assembly state of the plurality of parts; a calculating section that calculates the present position information indicating at least one of the present positions and the rotations of the plurality of parts in the assembly data on the basis of the relative-position information stored in the storage unit in response to the input of an instruction to change the assemble state of the plurality of parts; a detecting section that detects inconsistency between the absolute-position information stored in the storage unit by the saving section and the present position information calculated by the calculating section; and a correcting section that corrects the present position information calculated by the calculating section on the basis of the absolute-position information at a designated saving time in response to the input that the inconsistency detected by the detecting section is unintended one.

The present invention provides a method for supporting the creation of assembly data indicating the assembly state of a plurality of parts, the method including the steps of calculating absolute-position information indicating at least one of the absolute positions and the rotations of the plurality of parts in the assembly data on the basis of relative-position information indicating constraint conditions among the plurality of parts, the constraint conditions concerning at least one of the relative positions and the rotations of the parts; and saving the calculated absolute-position information into the storage unit in response to the input of an instruction to store the assembly state of the plurality of parts.

The present invention provides a program product for a computer to function as an apparatus that support the creation of assembly data indicating the assembly state of a plurality of parts, the program product including program code for the computer to function as an acquiring unit that acquires absolute-position information that is calculated on the basis of relative-position information indicating constraint conditions among the plurality of parts, the constraint conditions concerning at least one of the relative positions and the rotations of the parts, and the absolute-position information indicating at least one of the absolute positions and the rotations of the plurality of parts in the assembly data; and program code for the computer to function as a saving section that saves the absolute-position information acquired by the acquiring unit into the storage unit in accordance with an instruction to store the assembly state of the plurality of parts.

According to an embodiment of the present invention, the position information of parts at the time of intention of the designer can be managed so that discrepancy of the parts, if occurs, can be detected and corrected while the advantages of using relative constraint conditions among the parts.

DETAILED DESCRIPTION

Embodiments of the present invention will be described in detail with reference to the attached drawings.

In the embodiments, in addition to information on assembly constraints among the parts (relative-position information) in the existing parametric 3D-CAD, the absolute-position information of individual parts is stored at any time designated by the designer. In this specification, "position information" includes information indicating the position of a placed part and information indicating the rotation of the placed part. Of the two items of information, the position is indicated by, for example, coordinates relative to the origin, and the rotation is indicated by, for example, a rotation angle relative to the coordinate axes.

In these embodiments, two methods are proposed for the storage of the absolute-position information. Here, the first method will be described as "a first embodiment", and the second method will be described as "a second embodiment".

Outline of Storage of Absolute-Position Information

Figure 1:
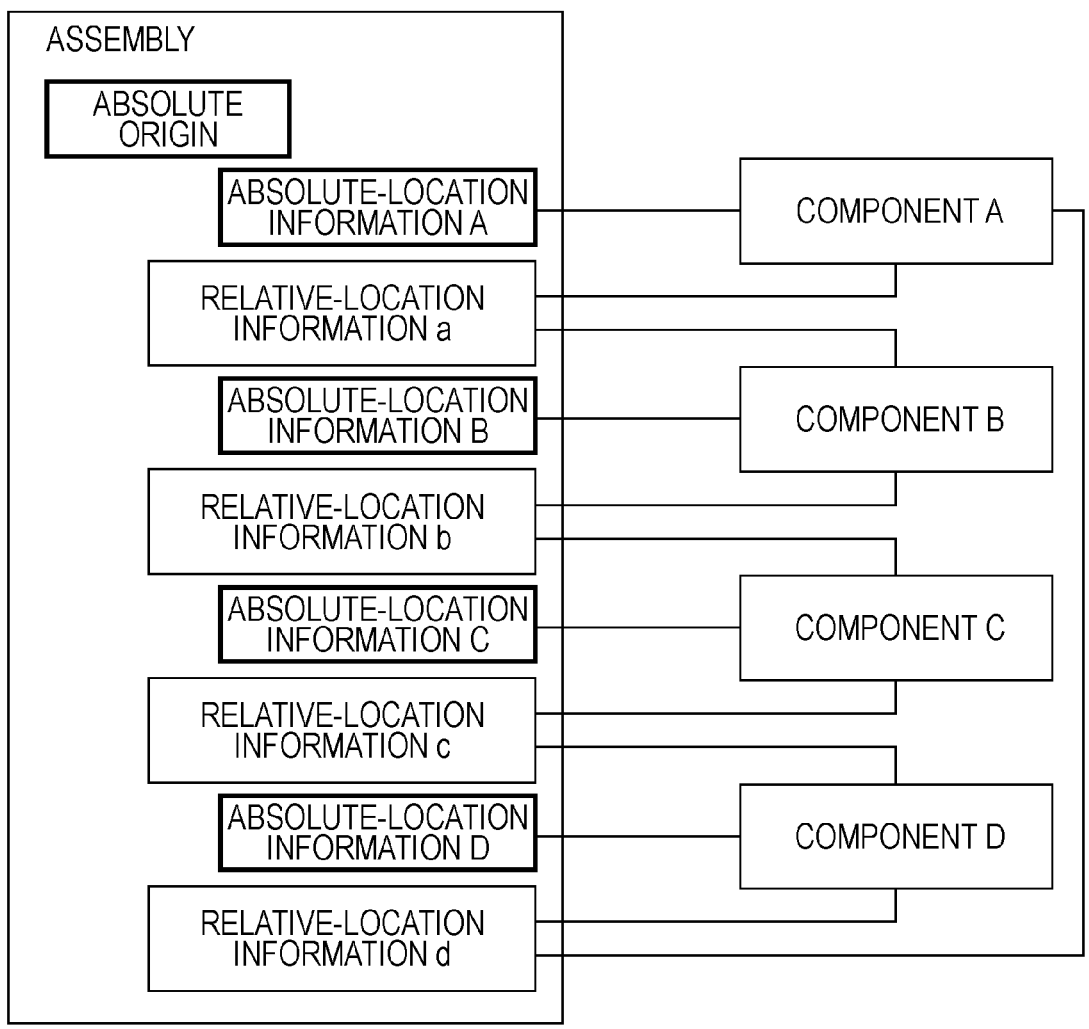
FIG. 1 is a diagram showing the outline of a first embodiment of the present invention.
Figure 2:
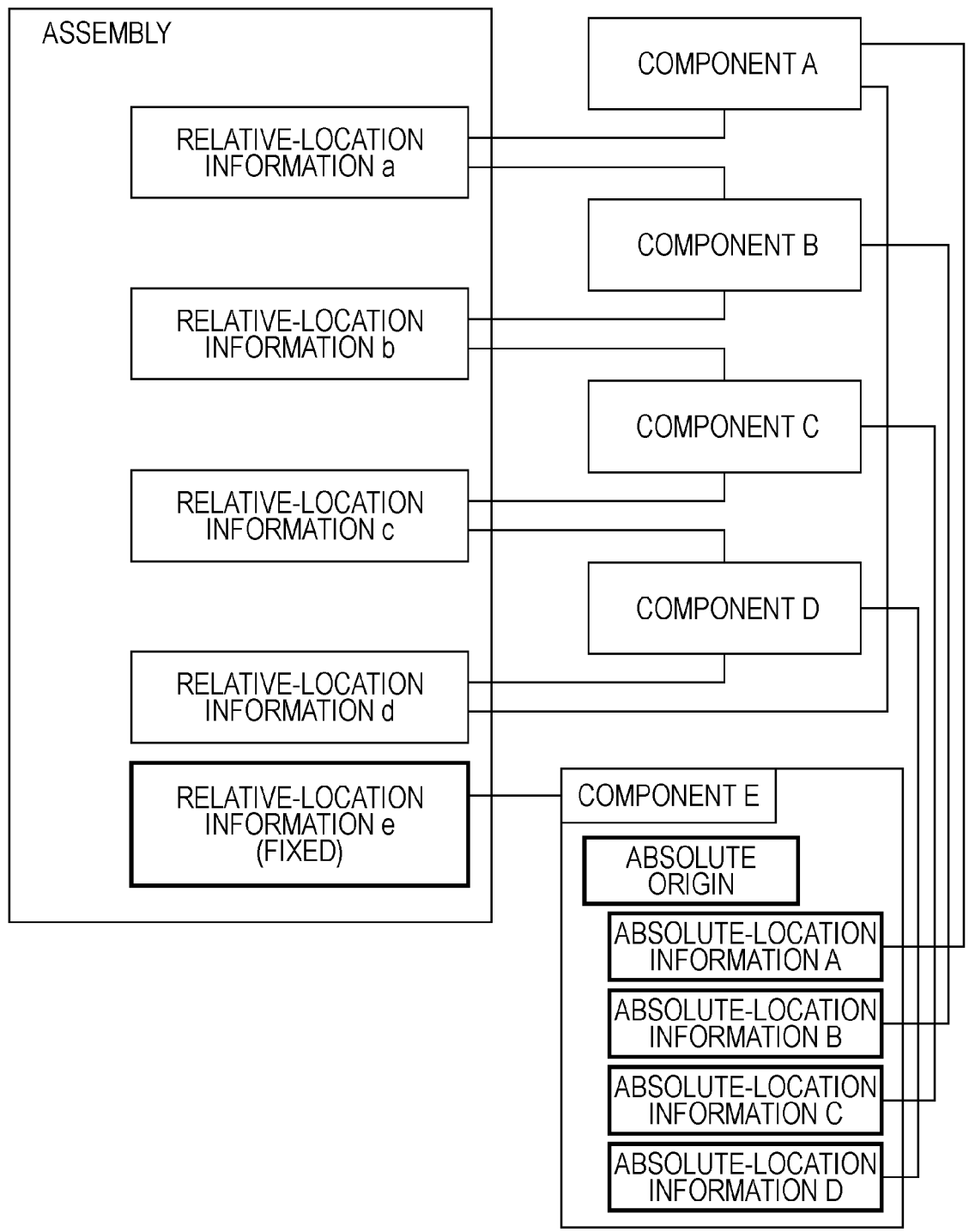
FIG. 2 is a diagram showing the outline of a second embodiment of the present invention.

FIGS. 1 and 2 show examples in which components A to D are put together into an assembly. Here, the term "component" is used instead of "part". Relative-position information a to d is stored as assembly constraints in the assembly.

FIG. 1 is a diagram showing a system for storing absolute-position information in a first embodiment.

In the first embodiment, as shown in FIG. 1, the absolute-position information A of a component A, the absolute-position information B of a component B, the absolute-position information C of a component C, and the absolute-position information D of a component D are stored in the assembly. An absolute origin (positional anchor) serving as the reference of the absolute-position information A to D is also set in the assembly.

It is also possible to store the past absolute-position information in the assembly according to the circumstances. This allows unexpected discrepancy of a component to be detected on the basis of the stored absolute-position information to thereby enable display of warning, correction of position, detection of a constraint that causes discrepancy, etc.

A large-scale assembly sometimes includes several hundred or several thousand components. Accordingly, it is not practical to manually store the absolute-position information. It is therefore preferable to incorporate the storage in a CAD as a function or to achieve the storage using a macro or the like. Such a function and a macro should be used by using a user interface, such as an icon, when the designer decides to store the absolute-position information as a snapshot.

FIG. 2 is a diagram showing a system for storing absolute-position information according to a second embodiment. The second embodiment is implementation that is advantageous in 3D-CAD in which, for example, the data structure of the assembly is not changed, and no position information can be stored in the assembly.

As shown in the drawing, the second embodiment further includes a component E that is handled on the same level as the components A to D. The component E is used as a component only for managing the absolute-position information A of the component A, the absolute-position information B of the component B, the absolute-position information C of the component C, and the absolute-position information D of the component D. Specifically, planes points, etc. are placed in the component E so as to match, for example, the origins of the components A to D, so that the absolute-position information of the components A to D is managed. The absolute origin (positional anchor) that serves as the reference of the absolute-position information A to D is also set in the component E. However, in the second embodiment, the component E needs to be fixed because the component E serves as the reference of all the components A to D. Thus, in FIG. 2, relative-position information e is stored as an assembly constraint in the assembly, so that the constraint condition that the component E is fixed in the assembly is set.

It is also possible to store the past absolute-position information in the component E, depending on the circumstances. Thus, if components are unexpectedly moved, the deviation of points, planes, etc. in the component E from the origins of the components A to D can be detected visually or by using an existing warning display function. Furthermore, if such discrepancy occurs, the components A to D are forcedly matched with the absolute-position information of the fixed component E to thereby find the proper positions of the components A to D and to detect relative-position information that is inconsistent with the relative-position information that is set at first.

The storage of the absolute-position information in the second embodiment can also be achieved by a function incorporated in the CAD or using a macro etc. In this case, a macro for creating the component E fixed in the assembly, detecting, for example, the origins of the components A to D, and storing the detected origins in the component E can be created by a combination of existing functions. The created macro should be used by using a user interface, such as an icon, when the designer decides to store the absolute-position information as a snapshot.

Configuration of CAD System

Figure 3:
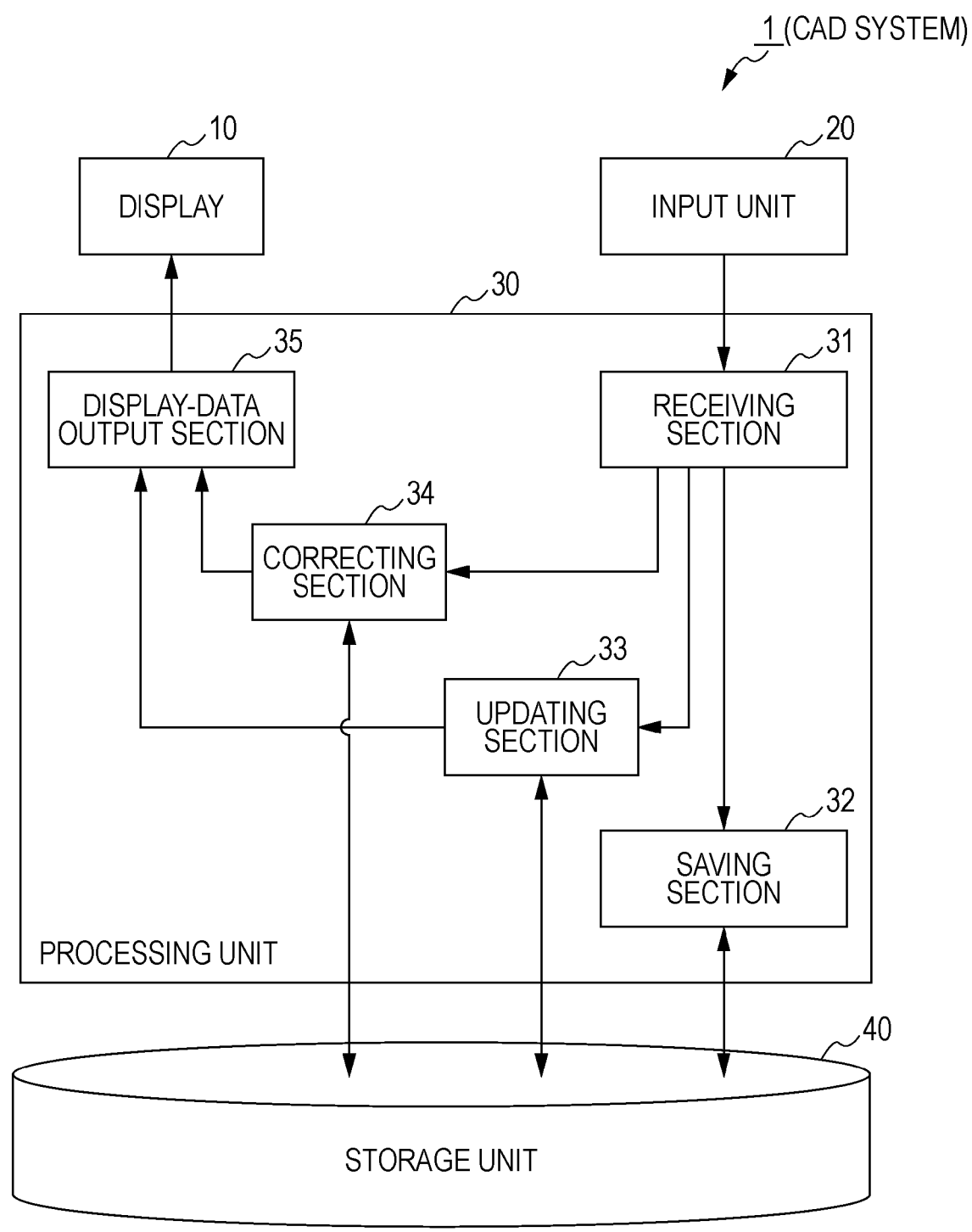
FIG. 3 is a block diagram showing an example of the functional configuration of a CAD system according to an embodiment of the present invention.

FIG. 3 is a block diagram showing the functional configuration of a CAD system 1 that stores such absolute-position information and detects and corrects discrepancy using the absolute-position information.

As shown in FIG. 3, the CAD system 1 includes a display 10, an input unit 20, a processing unit 30, and a storage unit 40.

The display 10 is a unit for displaying a screen for inputting information used for processing in the processing unit 30 and displaying the result of the processing in the processing unit 30. An example is a monitor, which corresponds to a display mechanism 90$d$ in FIG. 11 below.

The input unit 20 is a unit for inputting necessary information on, for example, a screen displayed on the display 10. Examples are a mouse and a keyboard, which correspond to a keyboard/mouse 90$i$ in FIG. 11 below.

The processing unit 30 is a unit having hardware, such as a CPU (central processing unit), that allows software, such as an application, to execute various computing processes etc. using the hardware. This corresponds to a CPU 90$a$, a motherboard chipset 90$b$, and a main memory 90$c$ in FIG. 11 below.

The storage unit 40 is a unit for storing data used for processing in the processing unit 30 and data of the results of processing in the processing unit 30. Specifically, the storage unit 40 stores data indicating the three-dimensional geometry of components (hereinafter referred to as geographic data) and data indicating the assembly state of a plurality of components (hereinafter referred to as assembly data). Examples are storage media, such as a HDD (hard disk drive) and a memory, which correspond to a magnetic disk unit 90$g$ in FIG. 11 below.

FIG. 3 also shows a functional configuration example of the processing unit 30.

As shown in FIG. 3, the processing unit 30 includes a receiving section 31, a saving section 32, an updating section 33, a correcting section 34, and a display-data output section 35.

The receiving section 31 receives an input from the input unit 20. Here, examples of the input to be received include a click of an icon displayed on the display 10 and a click of selection of information on a screen displayed on the display 10.

The saving section 32 saves the absolute-position information of individual geographic data into the storage unit 40 in accordance with an instruction from the receiving section 31.

The updating section 33 calculates and updates the positions of the individual geographic data in accordance with an instruction from the receiving section 31, and if inconsistency between absolute-position information calculated from the individual updated geographic-data position information and positions when the absolute-position information is lastly stored in the storage unit 40 is detected, displays a warning to notify the designer of the inconsistency. That is, the updating section 33 can include a calculating section that calculates the individual geographic-data position information and absolute-position information; and a detecting section that detects the inconsistency between the absolute-position information calculated from the updated individual geographic-data position information and the stored absolute-position information of the individual geographic data.

The correcting section 34 corrects the individual geographic-data position information, in accordance with an instruction from the receiving section 31, on the basis of the designer selection input of absolute-position information of the geographic-data absolute-position information stored in the storage unit 40.

The display-data output section 35 outputs display data for displaying information to the display 10. Here, examples of the output display data include data for displaying various screens for inputting from the input unit 20 and data of the results of processing in the processing unit 30.

Here, the data structure in the storage unit 40 will be described in detail. The data structure is also different between the first embodiment shown in FIG. 1 and the second embodiment shown in FIG. 2, so they will be separately described.

Figure 4:
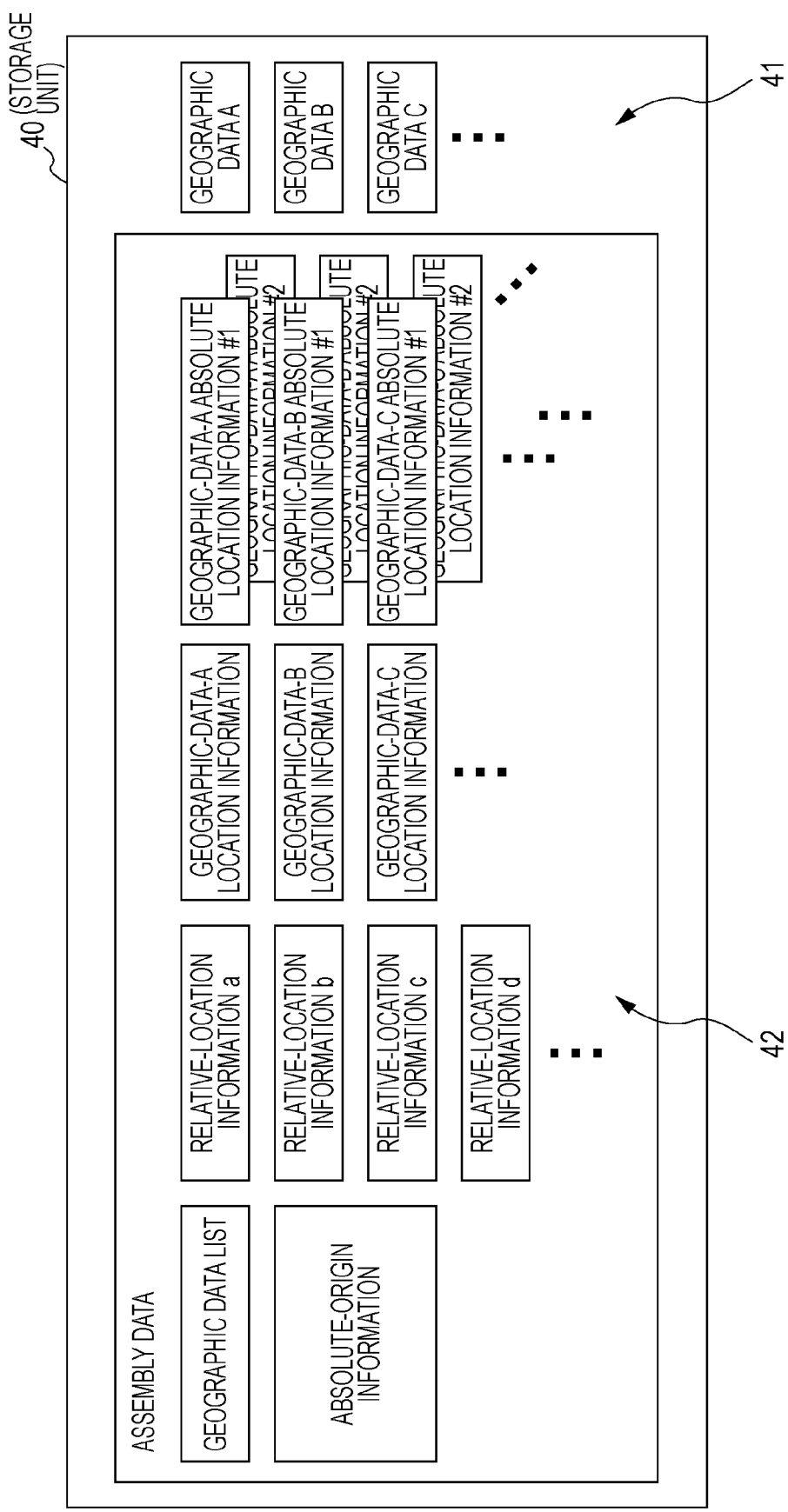
FIG. 4 is a diagram showing an example of a data structure in a storage unit according to the first embodiment of the present invention.

FIG. 4 is a diagram showing a data structure in the first embodiment.

As shown in FIG. 4, in the data structure, the storage unit 40 stores a geographic data group 41 and assembly data 42.

Here, the geographic data constellation 41 is a constellation of geographic data that indicates the three-dimensional geometry of components, as described above. The geographic data each includes information of planes, lines, points, etc. that define the three-dimensional geometry, parameters that define the positional relationship therebetween, etc. FIG. 4 shows geographic data A to C as geographic data included in the geographic data constellation 41.

The assembly data 42 is data that stores the assembly state of the geographic data constellation 41, as described above, and includes a geographic data list, absolute-origin information, a relative-position information constellation, a geographic-data position information constellation, and a geographic-data absolute-position information constellation.

Among them, the geographic data list is a list on which geographic data used in the assembly data 42 is recorded. That is, which is picked up from the plurality of items of geographic data into an assembly is designated from the list.

The absolute-origin information is information of an absolute origin that is used for calculating the position of geographic data as an absolute position not as a relative position. Here, the origin of the assembly data 42 may be used as the absolute origin, or alternatively, the geographic-data position information of the geographic data A may be used as the absolute origin.

The relative-position information constellation is a constellation of relative-position information that indicates the relative position relationship among the geographic data, that is, constraints among the geographic data defined by the designer (for example, distance constraint, angle constraint, coincidence of planes, parallel constraint, and contact constraint). FIG. 4 shows relative-position information a to d as the relative-position information contained in the relative-position information constellation.

The geographic-data position information constellation is a constellation of the position information (coordinates and rotation angles) of geographic data that the CAD system 1 normally holds. FIG. 4 shows, as the geographic-data position information contained in the geographic-data position information constellation, geographic-data-A position information, geographic-data-B position information, and geographic-data-C position information corresponding to the geographic data A, B, and C, respectively.

The geographic-data absolute-position information constellation is a constellation of absolute-position information (coordinates and rotation angles) obtained by calculating the position information of the individual geographic data with reference to the absolute origin. FIG. 4 shows geographic-data-A absolute position information, geographic-data-B absolute-position information, geographic-data-C absolute position information corresponding to the geographic data A, B, and C, respectively. The absolute-position information is stored many times at any time by the designer, and the past data is also held as a history. FIG. 4 shows that the absolute-position information is stored several times in the past by attaching #1, #2, . . . in reverse chronological order.

Figure 5:
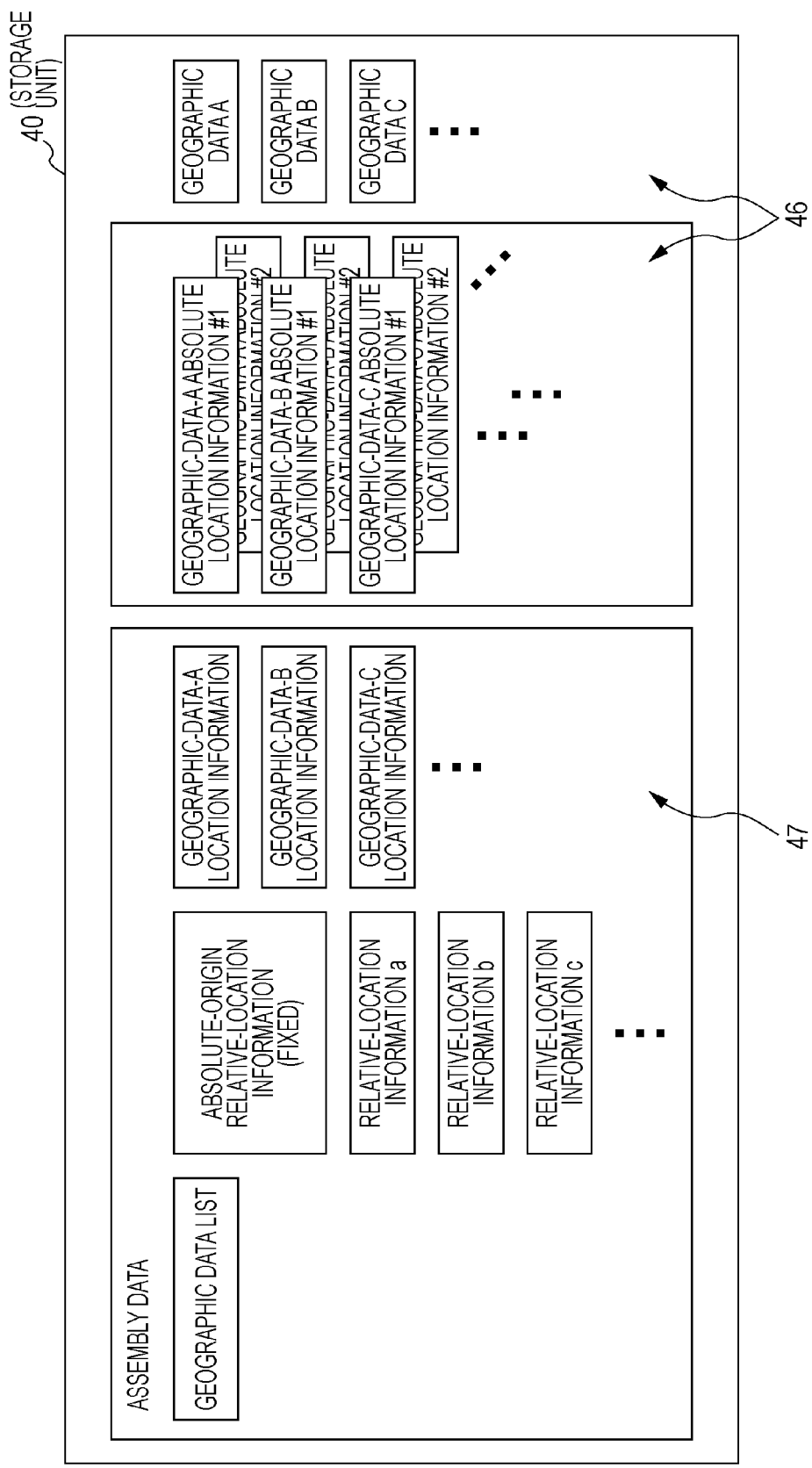
FIG. 5 is a diagram showing an example of a data structure in the storage unit according to the second embodiment of the present invention.

FIG. 5 is a diagram showing a data structure in the second embodiment.

As shown in FIG. 5, in this data structure, the storage unit 40 stores a geographic data constellation 46 and assembly data 47.

Here, the geographic data constellation 46 contains specific geographic data that indicates the geometry of components other than components used for assembly, in addition to the general geographic data that indicates three-dimensional geometry of components, shown in FIG. 4. FIG. 5 shows absolute-origin geographic data as an example of the specific geographic data.

The general geographic data includes information of planes, lines, and points that defines the three-dimensional geometry and parameters that define the positional relationship therebetween, etc. as in the case of FIG. 4. FIG. 5 shows geographic data A to C as the general geographic data.

The absolute-origin geographic data is newly created geographic data and includes an origin geometry (x-, y-, and z-axes, etc.) that defines an absolute origin in the three-dimensional space. The absolute-origin geographic data includes a geographic-data absolute-position information constellation. The geographic-data absolute-position information constellation is a constellation of absolute-position information that is obtained by calculating the position information of the individual geographic data with reference to the absolute origin. FIG. 5 shows geographic-data-A absolute-position information, geographic-data-B absolute-position information, and geographic-data-C absolute-position information corresponding to the geographic data A, B, and C, respectively. The absolute-position information is stored many times at any time by the designer, and the past data of the absolute positions of individual geographic-data other than the absolute-origin geographic data is stored as a history. FIG. 5 shows that the absolute-position information is stored at several times in the past by attaching #1, #2, . . . in reverse chronological order.

The assembly data 47 is data that holds the assembly state of the geographic data constellation 46, as described above, and includes a geographic data list, a relative-position information constellation, and a geographic-data position information constellation.

Among them, the geographic data list is a list in which geographic data used in the assembly data 47 is recorded. That is, which is picked up from the plurality of items of geographic data into an assembly is designated from the list. In the second embodiment, in particular, absolute-origin geographic data is also added to the geographic data list.

The relative-position information constellation is a constellation of relative-position information indicating the relative position relationship among the geographic data, that is, constraints among the geographic data defined by the designer (for example, distance constraint, angle constraint, coincidence of planes, parallel constraint, and contact constraint). FIG. 5 shows relative-position information a to c as the relative-position information contained in the relative-position information constellation. In the second embodiment, the relative-position information constellation further contains absolute-origin relative-position information that is relative-position information for the absolute-origin geographic data. This relative-position information is the constraint that "absolute-origin geographic data is fixed in the assembly data". Fundamentally, the geographic data can be located in any position, while the absolute-origin geographic data is fixed according to the absolute-origin relative-position information.

The geographic-data position information constellation is a constellation of the position information (coordinates and rotation angles) of geographic data that the CAD system 1 normally holds. FIG. 5 shows, as geographic-data position information contained in the geographic-data position information constellation, geographic-data-A position information, geographic-data-B position information, and geographic-data-C position information corresponding to the geographic data A, B, and C, respectively.

The data structures shown in FIGS. 4 and 5 are merely examples of a data structure in the storage unit 40. Another data structure may be adopted provided that the same function can be achieved.

Operating Procedure of CAD System

Figure 6:
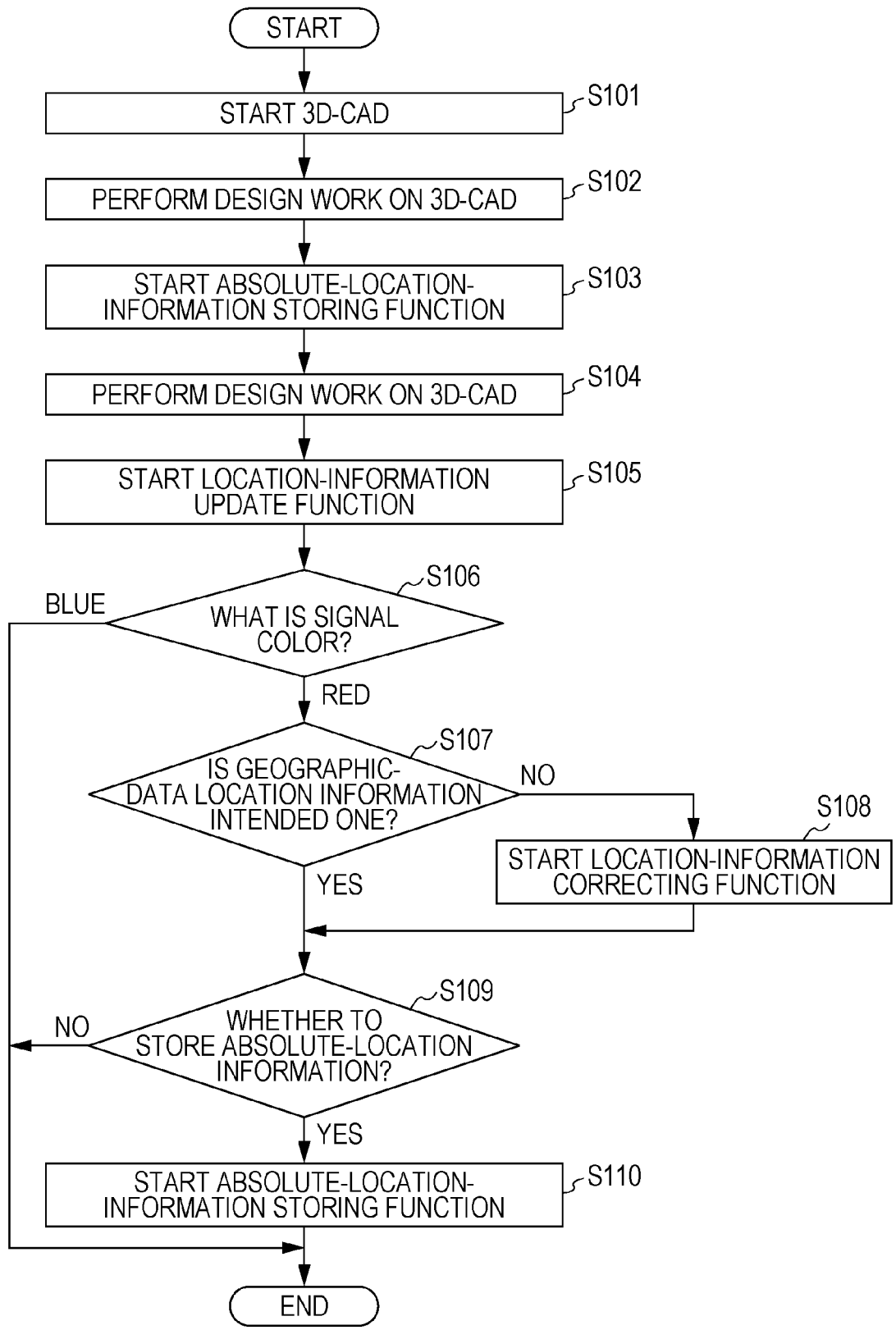
FIG. 6 is a flowchart showing an operating procedure of the CAD system according to an embodiment of the present invention.

FIG. 6 is a flowchart showing a designer's operating procedure of the CAD system 1.

First, the designer starts the 3D-CAD (step S101). Next, the designer executes design work on the 3D-CAD, such as, changing geographic data and updating relative-position information (step S102).

Thereafter, when the designer wishes to store the absolute-position information of the geographic data, the designer starts an absolute-position-information storing function, to be described later, by clicking on an icon displayed on the display 10 at any time (step S103). Thus, the absolute-position-information storing function operates, so that the absolute-position information is stored in the storage unit 40.

The designer continues the design work on the 3D-CAD, such as changing the geographic data and updating the relative-position information (step S104).

Thereafter, when the designer wishes to move the individual geographic data in accordance with the changed relative-position information, the designer starts a position-information update function, to be described later, by clicking on an icon displayed on the display 10 (step S105). Thus, the position-information update function operates. A signal may be lit on the display 10, as a user interface of the CAD system 1. The signal may be used to indicate the update state of the position information. That is, if there is geographic data whose position is updated after the absolute-position information is stored last, a red signal is preferably lit, and if there is no such geographic data, a blue signal is lit.

Thus, the designer determines what color the signal is (step S106).

As a result, if the signal is blue, there is no updated geographic-data position information, so the design work is terminated.

On the other hand, if the signal is red, then the designer determines whether the update of the geographic-data position information is intended one (step S107).

If the designer determines that the update is not intended one, then, the designer starts a position-information correcting function, to be described later (step S108). Thus, the position-information correcting function operates, so that the unintendedly updated geographic-data position information is corrected. If the designer determines that the update is intended one, the designer does not start the position-information correcting function.

Thereafter, the designer determines whether to store the absolute-position information of the updated geographic data (step S109).

As a result, if the designer determines to store the absolute-position information, then the designer starts the absolute-position-information storing function (step S110).

On the other hand, if the designer determines not to store the absolute-position information, the designer terminate the design work without starting the absolute-position-information storing function.

Absolute-Position-Information Storing Function

This function is a function for calculating the absolute-position information and storing the calculation. The absolute-position-information storing function is also different in operation between the first embodiment shown in FIGS. 1 and 4 and the second embodiment shown in FIGS. 2 and 5, so the storing function will be described separately.

Figure 7:
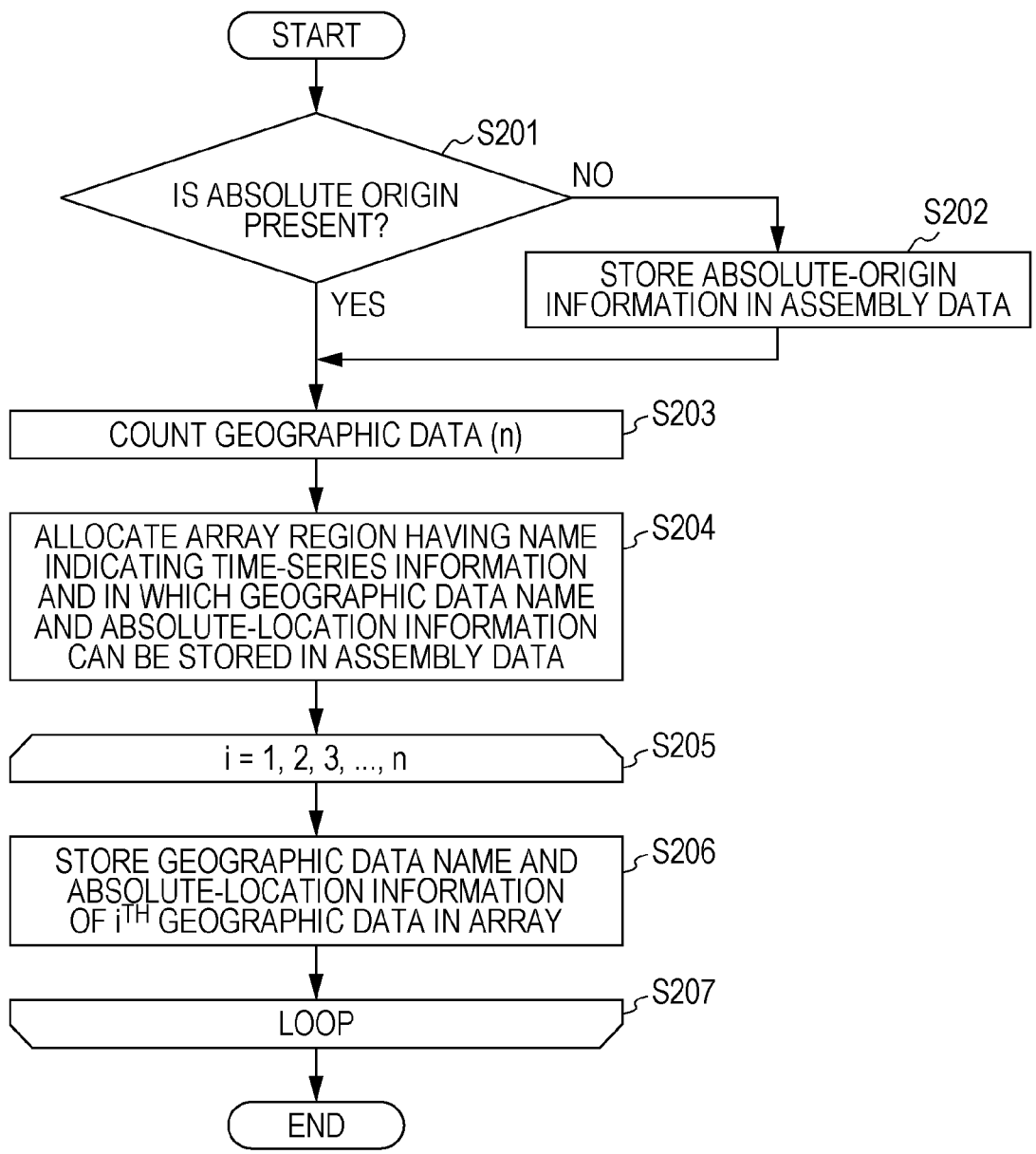
FIG. 7 is a flowchart showing an operation example of the CAD system when storing absolute-position information in the first embodiment of the present invention.

FIG. 7 is a flowchart showing an operation example of the CAD system 1 in which the absolute-position-information storing function in the first embodiment is achieved. In the following description, also refer to FIGS. 3 and 4. When the designer clicks on an icon corresponding to the absolute-position-information storing function at any time when the designer decided to store absolute-position information, the receiving section 31 receive the click operation from the input unit 20. The saving section 32 starts the absolute-position-information storing function in response to the reception of the click operation by the receiving section 31 to start the operation.

When the operation is started, the saving section 32 first refers to the assembly data 42 stored in the storage unit 40 to determine whether absolute-origin information is held therein (step S201).

As a result, if no absolute-origin information is held in the assembly data 42, any point, such as the origin of the assembly data 42, is set a an absolute origin, and the position information (coordinates and rotation angle) of the absolute origin with reference to the origin and the coordinate axes of the assembly data 42 is stored as absolute-origin information in the assembly data 42 (step S202).

On the other hand, if absolute-origin information has already been held in the assembly data 42, the existing absolute origin can be used, and thus, the setting of the absolute origin is not performed.

Next, the saving section 32 counts the number (n) of the geographic data (step S203).

Then, the saving section 32 allocates the region of an array in which geographic data name and absolute-position information can be stored in the assembly data 42 in accordance with the number (n) of the geographic data (step S204). Here, this array has a name indicating time-series information. A possible example of the name indicating time-series information is a name including the time of storage (date, time, etc.).

Thereafter, the saving section 32 repeats step S206 while substituting 1, 2, 3, . . . , n for variable i (steps S205 to S207). That is, the saving section 32 calculates relative-position information of the $i^{th}$ geographic data relative to the absolute origin and stores the relative-position information, as the absolute-position information, together with the geographic data name in the array (step S206). Thus, the absolute-position information is stored in the assembly data 42. Specifically, the differences (x, y, z, $\theta$, $\phi$, $\omega$) between the coordinates and the rotation angle of the absolute origin set in step S202 and the coordinates and the rotation angles of the individual geographic data should be calculated and stored.

Figure 8:
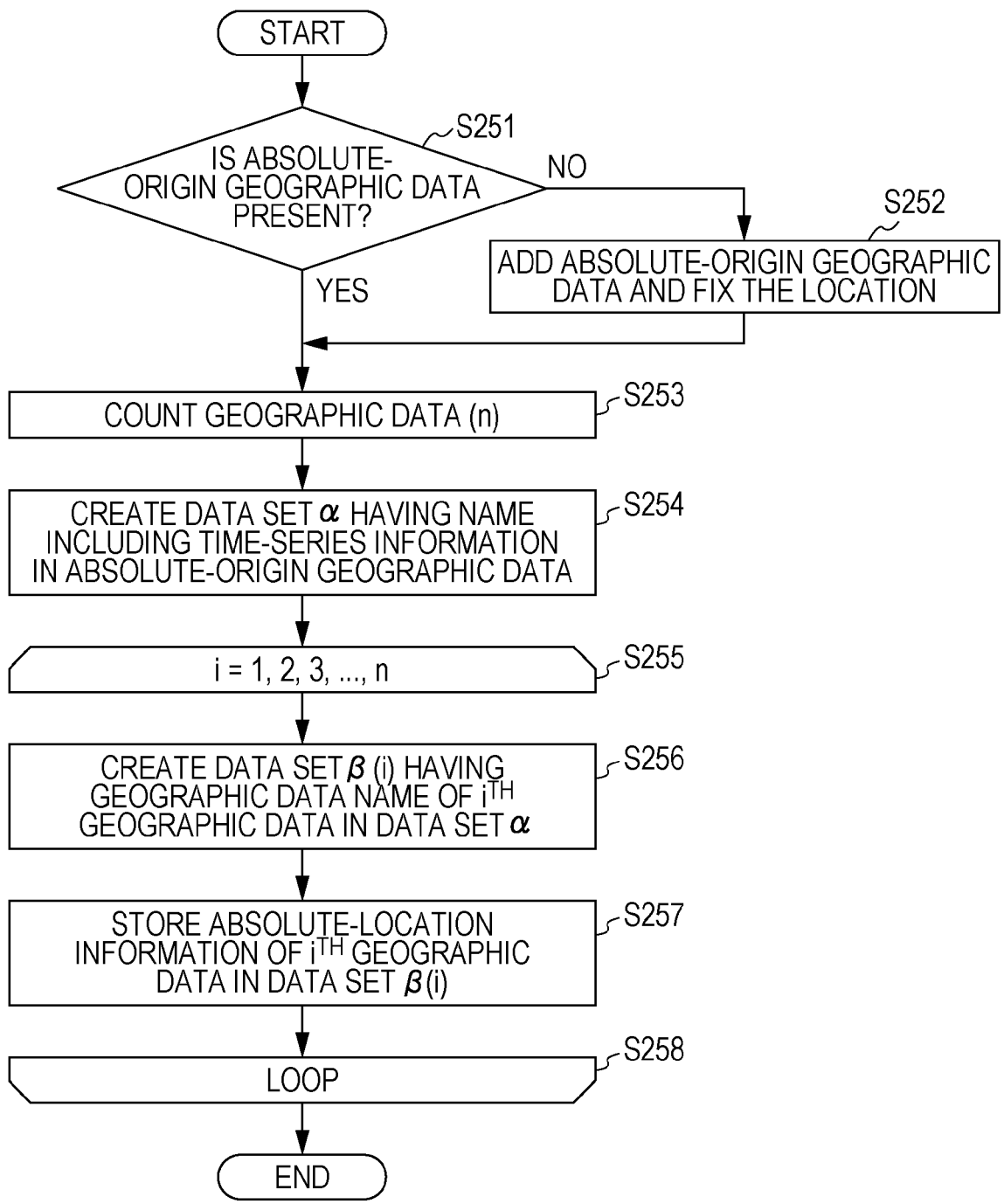
FIG. 8 is a flowchart showing an operation example of the CAD system when storing absolute-position information in the second embodiment of the present invention.

FIG. 8 is a flowchart showing an operation example of the CAD system 1 in which the absolute-position-information storing function in the second embodiment is achieved. In the following description, also refer to FIGS. 3 and 5. When the designer clicks on an icon corresponding to the absolute-position-information storing function at any time when the designer decides to store absolute-position information, the receiving section 31 receives the click operation from the input unit 20. The saving section 32 starts the absolute-position-information storing function in response to the reception of the click operation by the receiving section 31 to start the operation.

When the operation is started, the saving section 32 first searches the storage unit 40 to determine whether absolute-origin geographic data is held therein (step S251).

As a result, if no absolute-origin geographic data is stored in the storage unit 40, new geographic data is stored in the storage unit 40 as absolute-origin geographic data and the absolute-origin geographic data is fixed with the absolute-origin relative-position information in the assembly data 47 (step S252). That is, the geographic data can be fundamentally freely moved in the assembly data 47, but the absolute-origin geographic data is fixed so as not to be moved freely in the assembly data 47.

On the other hand, if absolute-origin geographic data has already been stored in the storage unit 40, the absolute-origin geographic data can be used, and thus the creation of absolute-origin geographic data is not performed.

Next, the saving section 32 counts the number (n) of the geographic data (step S253).

Then, data set α having a name including time-series information is created in the absolute-origin geographic data (step S254). A possible example of the name including time-series information is a name including the time of storage (date, time, etc.).

Thereafter, the saving section 32 repeats steps S256 and S257 while substituting 1, 2, 3, ..., n for variable i (steps S255 to S258). That is, the saving section 32 creates data set β(i) having a name including the geographic data name of the $i^{th}$ geographic data in the data set a (step S256). Then, the saving section 32 stores the absolute-position information of the $i^{th}$ geographic data in the data set β(i) (step S257). Specifically, forming three planes orthogonal to a position that matches the origin of the $i^{th}$ geographic data in the data set β(i) allows the absolute-position information to be held.

Position-Information Update Function

This function has the function of monitoring and checking changes in the individual geographic-data position information using stored absolute-position information and updates the geographic-data position information on the basis of relative-position information. As a result of checking, if the individual geographic-data position information is changed from the time when the absolute-position information is stored last, the red signal is preferably lit, and if no changes are given, the blue signal is lit.

Figure 9:
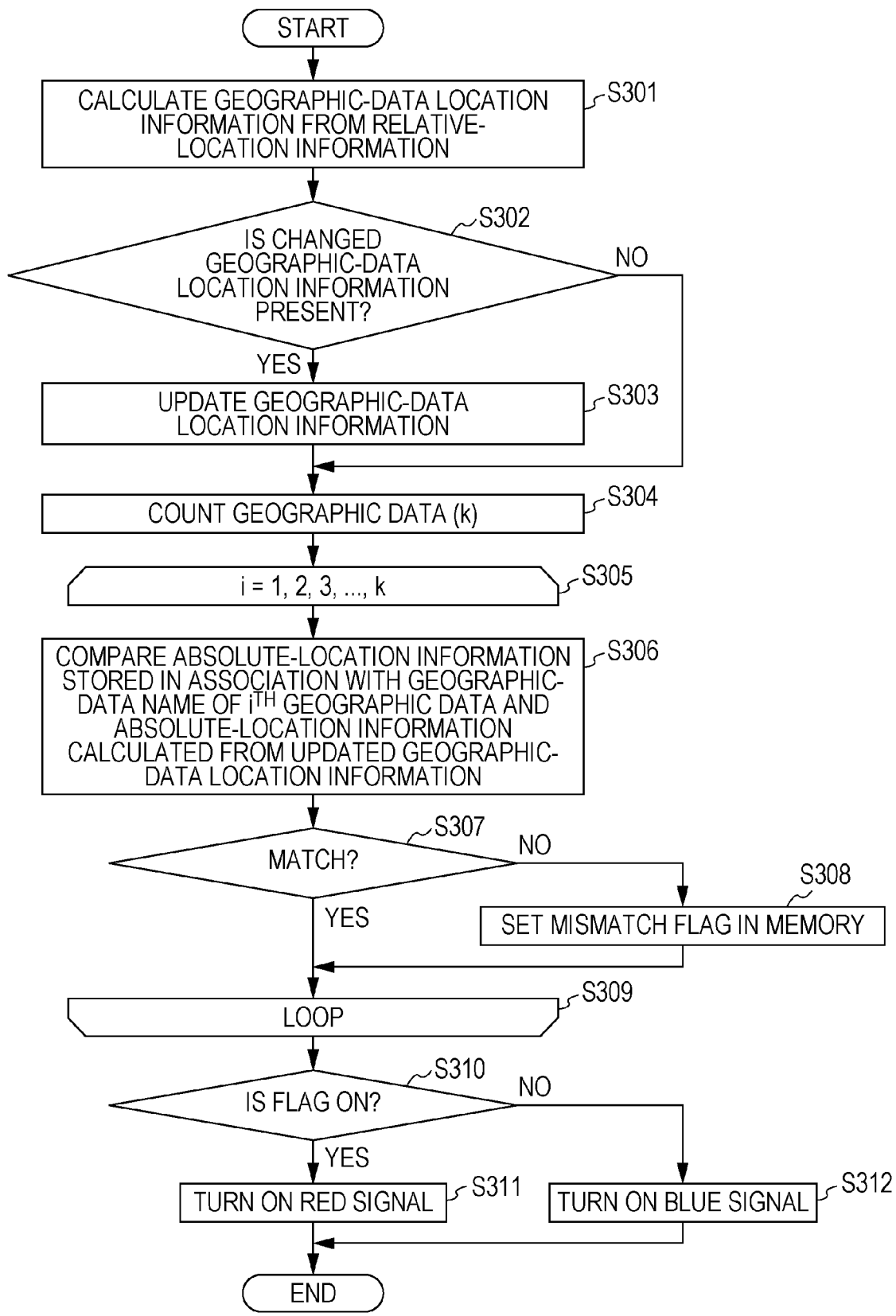
FIG. 9 is a flowchart showing an operation example of the CAD system when updating position information.

FIG. 9 is a flowchart showing an operation example of the CAD system 1 in which the position-information update function is achieved. In the following description, also refer to FIGS. 3 to 5. When the designer clicks on an icon corresponding to the position-information update function, the receiving section 31 receive the click operation from the input unit 20. The updating section 33 starts the position-information update function in response to the reception of the click operation by the receiving section 31 to start the operation.

When the operation is started, the updating section 33 first calculates the individual geographic-data position information from the relative-position information in the assembly data 42 or 47 in the storage unit 40 (step S301).

The updating section 33 determines whether there is changed geographic-data position information (step S302).

As a result, if there is changed geographic-data position information, the updating section 33 updates the geographic-data position information to be changed (step S303).

On the other hand, if there is no changed geographic-data position information, the update of geographic-data position information is not performed.

Next, the updating section 33 counts the number (k) of the geographic data (step S304).

Thereafter, the updating section 33 repeats steps S306 to 5308 while substituting 1, 2, 3, ..., k for variable i (steps S305 to 309). That is, the updating section 33 compares absolute-position information stored in association with the geographic data name of the $i^{th}$ geographic data with updated absolute-position information of the $i^{th}$ geographic data (step S306). Here, in the first embodiment, the absolute-position information is read from the assembly data 42, and in the second embodiment, the absolute-position information is read not from the assembly data 47 but from the absolute-origin geographic data in the geographic data constellation 46. In the first embodiment, the updated absolute-position information is calculated from the updated geographic-data position information in the assembly data 42 and from the absolute-origin information in the assembly data 42; and in the second embodiment, the updated absolute-position information is calculated from the updated geographic-data position information in the assembly data 47 and the origin geometry in the absolute-origin geographic data. The updating section 33 then determines whether the absolute-position information before and after the update matches (step S307).

As a result, if the absolute-position information before and after the update does not match, the updating section 33 sets a mismatch flag in a memory (not shown) in the updating section 33 (step S308).

On the other hand, if the absolute-position information before and after the update matches, the updating section 33 sets no flag in the memory.

After the process for all the geographic data is completed, the updating section 33 determines whether the mismatch flag is set in the memory (step S310).

As a result, if the mismatch flag is set in the memory, this indicates that the geographic-data position information is changed from the time when the absolute-position information is stored last in the storage unit 40. Therefore, the display-data output section 35 outputs display data for lighting the red signal to the display 10. Thus, the display 10 lights the red signal (step S311).

On the other hand, if no mismatch flag is set in the memory, this indicates that geographic-data position information is not changed from the time when the absolute-position information is stored last in the storage unit 40. Thus, the display-data output section 35 outputs display data for lighting the blue signal to the display 10. Thus, the display 10 lights the blue signal (step S312).

Position-Information Correcting Function

This function is the function of correcting geographic-data position information of unintended geographic data using stored absolute-position information.

Figure 10:
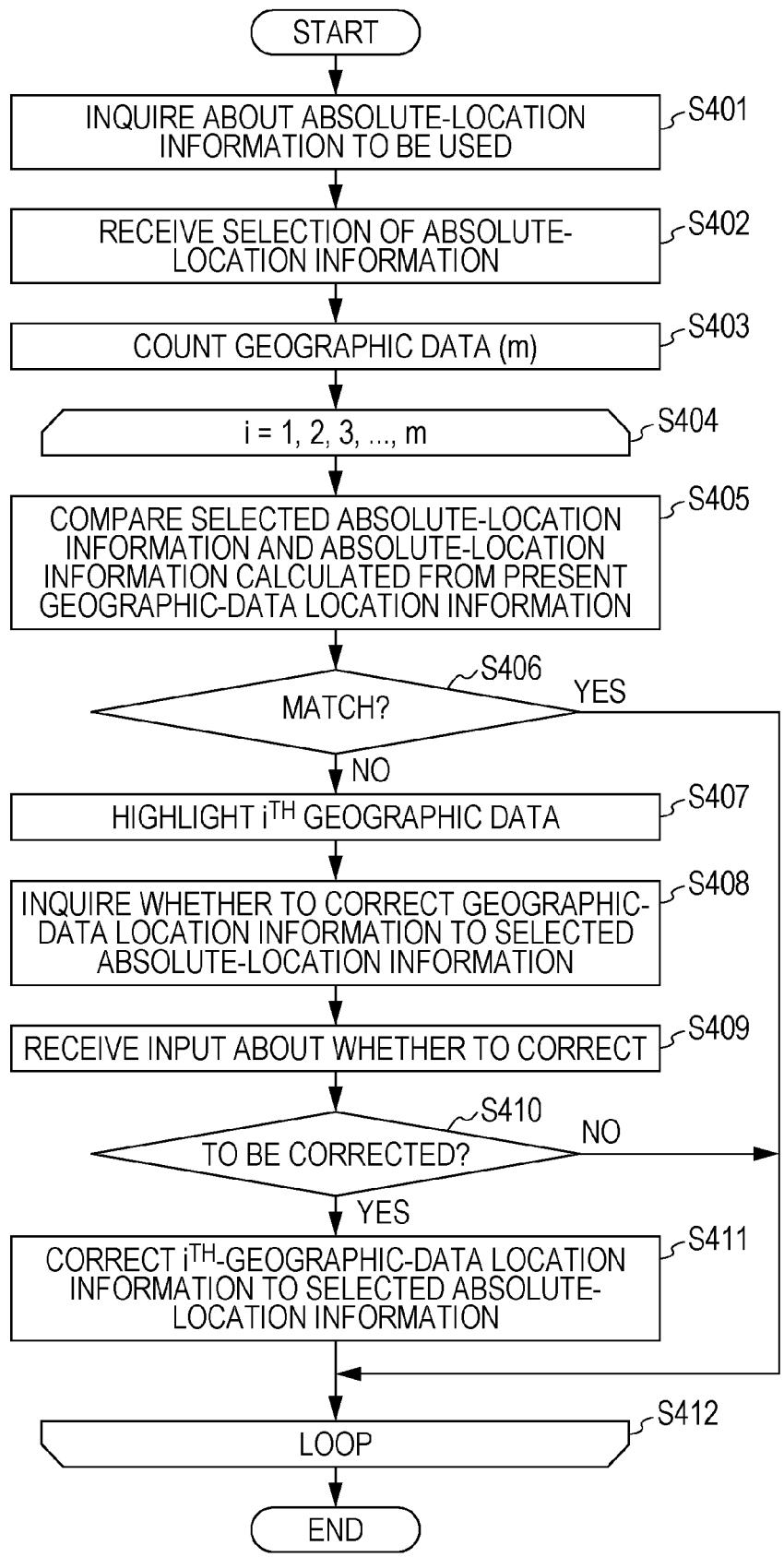
FIG. 10 is a flowchart showing an operation example of the CAD system when correcting position information.

FIG. 10 a flowchart showing an operation example of the CAD system 1 in which the position-information correcting function is achieved. In the following description, also refer to FIGS. 3 to 5. In a state in which there is geographic data having geographic-data position information different from that when absolute-position information is stored last in the storage unit 40, if the designer determines that the state is not intended one, the designer clicks on an icon corresponding to the position-information correcting function. Then, the receiving section 31 receives the click operation from the input unit 20. The correcting section 34 starts the position-information correcting function in response to the reception of the click operation by the receiving section 31 to start the operation.

When the operations is started, first, the display-data output section 35 outputs display data including a list of absolute-position information to the display 10 in accordance with an instruction from the correcting section 34. This list is used to inquire about which of absolute-position information stored in the storage unit 40 in reverse chronological order is used as the reference for the correction. That is, the display 10 displays the list of the absolute-position information so that the designer is inquired about absolute-position information to be used (step S401).

Then, the designer selects absolute-position information at a certain time from the list of absolute-position information displayed on the display 10 and inputs the absolute-position information with the input unit 20. Next, the receiving section 31 receives the input of the selection of the absolute-position information (step S402).

Next, the correcting section 34 counts the number (m) of the geographic data (step S403).

Thereafter, the correcting section 34 repeats steps S405 to S411 while substituting 1, 2, 3, ..., m for variable (steps S404 to S412).

That is, the correcting section 34 compares absolute-position information stored in association with the geographic data name of the $i^{th}$ geographic data of the absolute-position information at the selection with the present absolute-position information of the $i^{th}$ geographic data (step S405). Here, in the first embodiment, the absolute-position information is read from the assembly data 42, and in the second embodiment, the absolute-position information is read not from the assembly data 47 but from the absolute-origin geographic data in the geographic data constellation 46. In the first embodiment, the present absolute-position information is calculated from the present geographic-data position information in the assembly data 42 and from the absolute-origin information in the assembly data 42; and in the second embodiment, the present absolute-position information is calculated from the present geographic-data position information in the assembly data 47 and from the origin geometry in the absolute-origin geographic data. The correcting section 34 then determines whether the absolute-position information and the present absolute-position information match (step S406).

As a result, if the selected absolute-position information and the present absolute-position information do not match, the display-data output section 35 outputs, preferably, highlighted $i^{th}$ geographic data to the display 10. Next, the display 10 displays the highlighted geographic data (step S407). The display-data output section 35 outputs a dialog window, to the display 10, for checking whether to correct the $i^{th}$ geographic-data position information in accordance with the selected absolute-position information. Next, the display 10 displays the dialog window (step S408).

Then, the designer inputs a determination about correction from the input unit 20 in response to the highlighted display and the dialog window display. Next, the receiving section 31 receives the determination from the input unit 20 (step S409).

Thus, the correcting section 34 determines whether an input indicating correction has been made (step S410).

As a result, if the input for correction has been made, the correcting section 34 corrects the geographic-data position information in accordance with the selected absolute-position information (step S411).

On the other hand, if it is determined in step S406 that the absolute-position information and the present absolute-position information match, and if an input indicating no correction is made, the process for the $i^{th}$ geographic data is completed.

Thus, the operation of the embodiments comes to an end.

While the embodiments assume that the position information includes position and angle, both of them may not necessarily be included. That is, the position information may include either only positional information or only angle information; thus, the geographic-data position information can be information indicating at least one of position and angle.

In the embodiments, the absolute-position-information storing function, the position-information update function, and the position-information correcting function are described as separate independent functions. Alternatively, these functions may be executed in a serial flow. For example, referring to FIG. 6, if the CAD system 1 determines in step S106 that the red signal is lit, the designer may be inquired in step S107 on a dialog window about whether the geographic-data position information is intended one, wherein if the designer replies that the geographic-data position information is not intended one, the position-information correcting function may be started in step S108.

Furthermore, while this embodiment is configured such that to store the absolute-position information of the geographic data using the absolute-position-information storing function, and thereafter, uses the stored absolute-position information to check position information with the position-information update function or to correct position information with the position-information correcting function, its use is not limited thereto. The stored absolute-position information may be used for any use provided that the absolute-position information is retrospectively used; for example, the absolute-position information may be used to simply display absolute-position information designated by the designer.

Although the embodiments are configured to store the absolute-position information with time-series tags by the absolute-position-information storing function, the invention is not limited thereto. Any information that allows a plurality of items of absolute-position information to be identified is possible; for example, information that indicates the order of storage is possible. In other words, the time-series information and information that indicates the order of storage are examples of multiple-absolute-position-information identification information.

Furthermore, the embodiments may further include a configuration etc. for setting whether to display a warning when geographic data is moved so that no warning is displayed every time geographic data is moved.

In this way, the embodiments are configured to store the absolute-position information of the components as a snapshot, for example, when the designing comes to the end of the first stage. Thus, if unexpected discrepancy occurs in the relative position among the components by subsequent designing, the discrepancy can be detected. Furthermore, snapshots can be updated when necessary mainly using assembly constraints, so the constraints which are an advantage of the parametric 3D-CAD can be used as ever. That is, the use of the relative-position information that is constraints reflecting design intention, which is a feature of the parametric 3D-CAD, and the absolute-position information that manages unexpected discrepancy of the components can prevent design error due to unexpected discrepancy. Moreover, a warning can be given at the occurrence of discrepancy. In this case, setting a reference component in advance allows the designer to uniquely recognize which component is deviated how much.

Since the embodiments have the function of updating the snapshot at any time, the position information can be checked with reference to the relative position relationship among the components when the designer determines that check is necessary.

Furthermore, the past snapshots can be referred to as a history by storing the past snapshots as necessary. In this case, time-stamping the snapshots allows determination on when the snapshots are created. Moreover, if discrepancy occurs, the components can be forcedly returned to positions and angles indicated by the stored absolute-position information.

Furthermore, the embodiments can also be used as means for easily storing the position information of the components in a case where perfect design is not yet determined, so proper constraints cannot be added.

Figure 11:
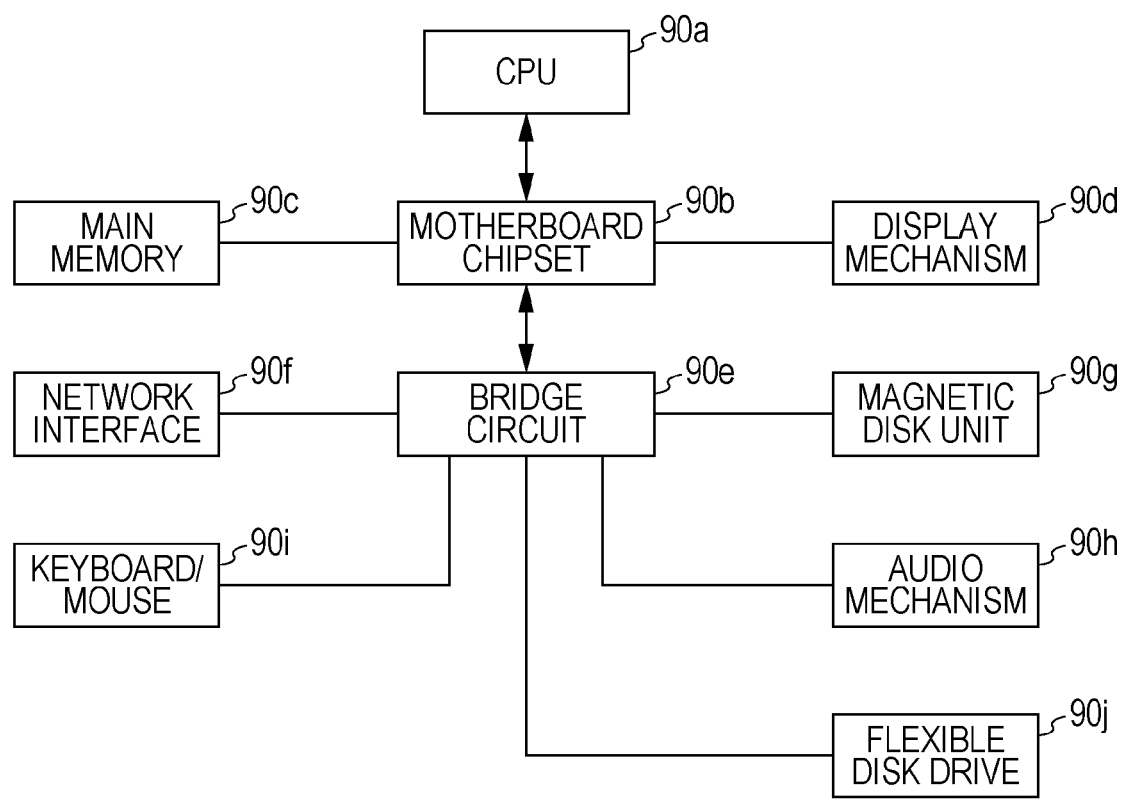
FIG. 11 is a diagram showing a computer hardware configuration to which an embodiment of the present invention can be applied.

Finally, a computer hardware configuration that is suitable for application of the embodiments will be described. FIG. 11 is a diagram showing an example of such a computer hardware configuration. As shown in FIG. 11, the computer includes the CPU (central processing unit) 90a serving as an operating unit, the main memory 90c connected to the CPU 90a via the motherboard chipset 90b, and the display mechanism 90d that is connected to the CPU 90a via the motherboard chipset 90b as well. The motherboard chipset 90b connects to a network interface 90f, the magnetic disk unit (HDD) 90g, an audio mechanism 90h, the keyboard/mouse 90i, and a flexible disk drive 90j via a bridge circuit 90e.

In FIG. 11, the components are connected through a bus. For example, the CPU 90a and the motherboard chipset 90b and the motherboard chipset 90b and the main memory 90c are connected through a CPU bus. The motherboard chipset 90b and the display mechanism 90d may be connected using an AGP (accelerated graphics port). However, in a case where the display mechanism 90d includes a PCI-Express-ready video card, the motherboard chipset 90b and the video card are connected through a PCI Express (PCIe) bus. For connection with the bridge circuit 90e, for example, the PCI Express can be used for the network interface 90f; for example, a serial ATA (AT attachment), a parallel transfer ATA, or a PCI (peripheral components interconnect) can be used for the magnetic disk unit 90g; and a USB (universal serial bus) can be used for the keyboard/mouse 90i and the flexible disk drive 90j.

The present invention may be achieved only by software, or alternatively, may be achieved by both of hardware and software. The present invention can also be achieved as a computer, a data processing system, and a computer program product. The computer program product can be stored in a computer-readable medium for provision. Possible examples of the medium are electronic, magnetic, optical, electromagnetic, infrared, and semiconductor systems (unit or apparatus) or a transmission medium. Examples of the computer-readable medium are a semiconductor solid-state storage device, magnetic tape, a removable computer diskette, a random access memory (RAM), a read-only memory (ROM), a rigid magnetic disk, and an optical disk. Examples of the optical disk at the present include a compact disc read-only memory (CD-ROM), a compact disc read/write (CD-R/W), and a DVD.

While the present invention has been described with reference to the embodiments, it is to be understood by those skilled in the art that technical scope of the present invention is not limited to the foregoing embodiments and that various changes and modifications can be made without departing from the spirit and scope of the present invention.

The invention claimed is:

1. An apparatus that supports creation of assembly data indicating an assembly state of a plurality of parts, the apparatus comprising:
a storage unit including computer memory and configured to store information about relative positions indicating constraint conditions among the plurality of parts, the constraint conditions concerning at least one of the relative positions and rotations of the parts;
a calculating section configured to calculate information about absolute positions indicating at least one of the absolute positions and the rotations of the plurality of parts in the assembly data on the basis of the relative position information stored in the storage unit;
a saving section configured to save the absolute position information calculated by the calculating section in response to input of an instruction to save the assembly state of the plurality of parts into the storage unit, wherein the saving section is configured to save the absolute position information together with identification information about the absolute position information into the storage unit; and
a correcting section configured to correct, on the basis of absolute position information identified from the absolute position information stored in the storage unit by the saving section due to input of the identification information, new absolute position information that is calculated by the calculating section after the absolute position information is stored in the storage unit.

2. The apparatus according to claim 1, further comprising a detecting section configured to detect inconsistency between the absolute position information stored in the storage unit by the saving section and new absolute position information calculated by the calculating section after the absolute position information is stored in the storage unit.

3. The apparatus according to claim 1, wherein
the storage unit is configured to store geographic data indicating the geometry of the plurality of parts and the assembly data and to store the relative position information in the assembly data; and
the saving section configured to save the absolute position information into the assembly data stored in the storage unit.

4. The apparatus according to claim 3, wherein the storage unit is configured to store, in the assembly data, absolute origin information indicating at least one of an origin and the absolute positions and rotations of coordinate axes serving as the reference of the absolute position information in the assembly data.

5. The apparatus according to claim 1, wherein
the storage unit is configured to store geographic data indicating the geometry of the plurality of parts, specific geographic data indicating geometry of parts other than the plurality of parts, and the assembly data, and to store the relative-position information in the assembly data; and
the saving section is configured to save the absolute position information into the specific geographic data stored in the storage unit.

6. The apparatus according to claim 5, wherein
the storage unit is configured to store absolute origin geographic data, as the specific geographic data, that indicates the geometry of an origin part that defines at least one of the origin and the absolute positions and the rotations of the coordinate axes serving as the reference of the absolute-position information in the assembly data, and to store, in the assembly data, absolute origin relative position information indicating that the origin part is fixed in the assembly data as a constraint condition between the origin part and the assembly data, the constraint condition concerning at least one of the relative positions and rotation angles.

7. An apparatus that supports creation of assembly data indicating an assembly state of a plurality of parts, the apparatus comprising:
a storage unit configured to store relative position information indicating constraint conditions among the plurality of parts, the constraint conditions concerning at least one of the relative positions and rotations of the parts;
a saving section configured to save absolute position information indicating at least one of the absolute positions and the rotations of the plurality of parts in the assembly data into the storage unit in such a manner that the saving time of the absolute position information can be specified in response to input of an instruction to store the assembly state of the plurality of parts;

a calculating section configured to calculate using at least one computer processor the present position information indicating at least one of present positions and the rotations of the plurality of parts in the assembly data on the basis of the relative position information stored in the storage unit in response to the input of an instruction to change the assemble state of the plurality of parts;

a detecting section configured to detect inconsistency between the absolute position information stored in the storage unit by the saving section and the present position information calculated by the calculating section; and a correcting section configured to correct the present position information calculated by the calculating section on the basis of the absolute position information at a designated saving time in response to the input that the inconsistency detected by the detecting section is unintended one.

8. A method for supporting creation of assembly data indicating an assembly state of a plurality of parts, the method comprising:

calculating by at least one computer processor absolute position information indicating at least one of the absolute positions and rotations of the plurality of parts in the assembly data on the basis of relative position information indicating constraint conditions among the plurality of parts, the constraint conditions concerning at least one of the relative positions and the rotations of the parts;

saving in computer memory the calculated absolute position information into the storage unit in response to input of an instruction to store the assembly state of the plurality of parts;

detecting inconsistency between the absolute position information stored in the storage unit and new absolute position information calculated after the absolute position information is stored in the storage unit; and correcting the new absolute position information calculated after the plurality of absolute position information is stored in the storage unit on the basis of absolute position information identified from the plurality of absolute position information stored in the storage unit due to the input of identification information.

9. A program product for a computer to function as an apparatus that supports the creation of assembly data indicating the assembly state of a plurality of parts, the program product stored in a non-transitory computer memory and comprising:

program code for the computer to function as an acquiring unit that acquires absolute position information that is calculated on the basis of relative position information indicating constraint conditions among the plurality of parts, the constraint conditions concerning at least one of the relative positions and the rotations of the parts, and the absolute position information indicating at least one of the absolute positions and the rotations of the plurality of parts in the assembly data; and program code for the computer to function as a saving section that saves the absolute position information acquired by the acquiring unit into the storage unit in accordance with an instruction to store the assembly state of the plurality of parts;

program code for detecting inconsistency between the absolute position information stored in the storage unit and new absolute position information calculated after the absolute position information is stored in the storage unit; and program code for correcting the new absolute position information calculated after the plurality of absolute position information is stored in the storage unit on the basis of absolute position information identified from the plurality of absolute position information stored in the storage unit due to the input of identification information.

* * * * *